United States Patent [19]
Takeuchi et al.

[11] Patent Number: 5,737,096
[45] Date of Patent: Apr. 7, 1998

[54] LIGHT ILLUMINATION ASSEMBLY HAVING A TAPERED LIGHT GUIDE PLATE FOR AN OPTICAL READING UNIT

[75] Inventors: Masaru Takeuchi, Handa; Yasuhito Bandai, Nagoya; Akira Kobayashi, Anjou; Katsutoshi Seguchi, Nishikamo-gun, all of Japan

[73] Assignee: Brother Kogyo Kabushiki Kaisha, Nagoya, Japan

[21] Appl. No.: 621,610

[22] Filed: Mar. 26, 1996

[30] Foreign Application Priority Data

Mar. 27, 1995 [JP] Japan ................... 7-094475

[51] Int. Cl.⁶ ........................................ H04N 1/10
[52] U.S. Cl. ........................................ 358/475; 358/484
[58] Field of Search ........................ 358/296, 300, 358/484, 474–475; 348/131, 197, 370

[56] References Cited

U.S. PATENT DOCUMENTS

| | | | |
|---|---|---|---|
| 4,220,978 | 9/1980 | Rhyins et al. | 358/293 |
| 4,727,380 | 2/1988 | Miura et al. | 346/108 |
| 5,347,124 | 9/1994 | Narukawa et al. | 250/235 |

FOREIGN PATENT DOCUMENTS

| | | |
|---|---|---|
| A-62-43960 | 2/1987 | Japan. |
| A-62-262572 | 11/1987 | Japan. |
| A-63-64471 | 3/1988 | Japan. |
| A-64-37158 | 2/1989 | Japan. |
| U-1-77065 | 5/1989 | Japan. |
| A-1-305766 | 12/1989 | Japan. |
| A-3-219761 | 9/1991 | Japan. |

*Primary Examiner*—Edward L. Coles, Sr.
*Assistant Examiner*—Stephen Brinich
*Attorney, Agent, or Firm*—Oliff & Berridge, P.L.C.

[57] ABSTRACT

An optical guide device in an optical reading system incorporated in a facsimile device, copying machine, image scanner and the like includes an array of LEDs and a light guide plate. When the light guide plate is cut along the longitudinal axis to give a cross-section in which the thickness appears, the cross-section is in a tapered shape and the thickness of the light guide plate at the side confronting the light array increases toward the opposite side facing the document. The light emerging from the light guide plate is high and uniform in light intensity level, so that a CCD unit picks up the light reflected from the document with high accuracy.

12 Claims, 6 Drawing Sheets

LIGHT ILLUMINATION ASSEMBLY HAVING A TAPERED LIGHT GUIDE PLATE FOR AN OPTICAL READING UNIT

BACKGROUND OF THE INVENTION

1. Field of the Invention

The present invention relates to an optical reading system for use in a facsimile device, copying machine, image scanner and the like, and more particularly to an optical guide device in the optical reading system which can illuminate the surface of a document with a light of high and uniform intensity level.

2. Description of the Prior Art

Optical reading systems are incorporated in various apparatuses, such as a facsimile device, copying machine, image scanner and the like. The optical reading system includes a light source for emitting a light beam t be irradiated onto the surface of the document which carries images to be optically read. A light beam having a slit-shaped cross-section is illuminated onto the surface of the document to traverse the width of the document. To read the images on the document with high accuracy, light illumination on the surface of the document needs to be at high level and the light intensity over the cross-sectional area of the light beam needs to be as even as possible. To this end, various types of light guide devices for use in conjunction with the light source have been proposed in the art.

For example, Japanese Laid-Open Patent Publication Nos. Sho-62-262572, Sho-63-64471 and Sho-64-37158 disclose using a cylindrical lens in combination with an LED array. The cylindrical lens is used to focus the light emitted from a plurality of LEDs onto the document. Japanese Laid-Open Patent Publication Nos. Sho-62-43960, Hei-1-305766 and Hei-3-219761 disclose using a bar-shaped lens having a semi-circular cross-section as a lens for focusing the light. However, with the conventional optical components described in the above publications, the light illumination on the surface of the document is not sufficient and further the light distribution on the entire cross-sectional area of the light beam is not uniform, so that an image sensor is incapable of accurately reading images on the document.

SUMMARY OF THE INVENTION

Accordingly, an object of the present invention is to provide an optical reading system which can project light of uniform illumination distribution and of high level intensity onto a document.

Another object of the present invention is to provide an optical reading system manufactured at low cost.

To achieve the above and other objects, there is provided, according to one aspect of the invention, an optical guide system including a light source and a light guide plate. The light guide plate has is fixedly mounted on a support member and has a top surface, a bottom surface opposite the top surface, a first side face, a second face opposite to the first side face, a third side face, and a fourth side face opposite to the third side face. The light guide plate has a longitudinal axis which is parallel to the top and bottom surfaces and also to the third and forth side faces but is perpendicular to the first and second side faces. The thickness of the light guide plate is defined by the dimension between the top and bottom surfaces. The light source is disposed in confrontation with the first side face to allow the light emitted from the light source to incident thereon. A document carrying an image to be optically read is disposed to face the second side face so that the light emerged from the second side face is projected thereonto. When cutting the light guide plate along the longitudinal axis to give a cross-section in which the thickness appears, the cross-section is in a tapered shape having a side slanted with respect to the longitudinal axis, and the thickness of the light guide plate increases toward the second side face.

According to another aspect of the present invention, there is provided an optical reading system which includes an optical guide system as described above, a moving mechanism for moving at least one of the first optical guide system and the document relative to each other, another optical guide system receiving the light reflected from the document and guiding the light along a predetermined path, and an image sensor receiving the light guided by the second optical guide system.

In the optical reading system of the present invention, an angle formed between the side of the tapered shaped and the longitudinal axis is substantially equal to 3 degrees. For the light source, used is a plurality of light emitting elements juxtaposed in a direction perpendicular to the longitudinal axis.

Preferably, the thickness of the light guide plate at the second side face is substantially equal to 3 mm or the thickness of the light guide plate at the first side face is substantially equal to 3 mm.

For applying the optical reading system of the present invention to facsimile devices, the first optical guide system may be fixedly mounted and the moving mechanism may move the document relative to the first optical guide system. The image sensor may be a CCD unit which includes a plurality of charge-coupled devices.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

In view of the recognitions that document reading errors frequently occur in the facsimile devices that use the cylindrical lens and the semi-circular cross-sectional bar-shaped lens, the present inventors conducted experiments to investigate the light intensity distribution in the cross-section of the light beam that is illuminated on the document for the cases where these two types of lenses are used. In the experiments, an LED array with eighteen (18) LEDs are used and lenses of 225 mm length are used. The lens is disposed in proximity with the LED array in such a positional relationship in which the lengthwise direction of the lens is in parallel with the array of the LEDs. A photo-diode is disposed 3 mm apart from the opposite side of the lens. An illuminometer is coupled to the photo-diode to measure the illumination distribution of light received at the light receiving surface of the photo-diode.

Figure 8:
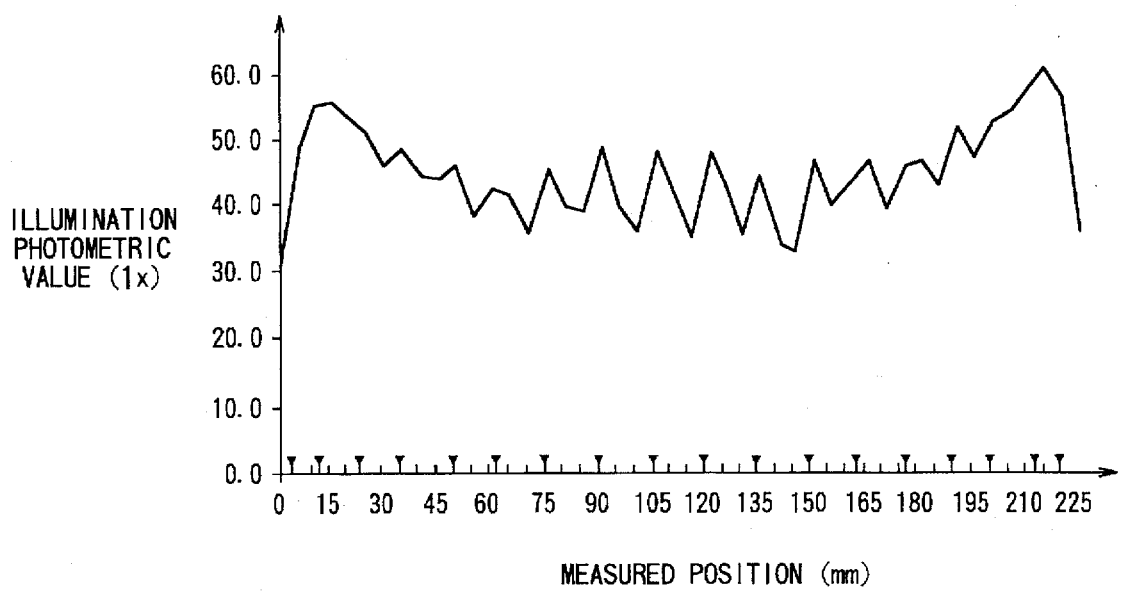
FIG. 8 is a graphical representation showing a light illumination distribution on a surface of an image sensor reached through a bar-shaped lens.

No substantial differences are seen in the experimental results regardless of which type of lens is used. FIG. 8 shows experimental results. Eighteen solid triangular marks on the axis of abscissa represent the positions of the LEDs and the axis of ordinate represents the illumination (unit: lux) measured by the illuminometer. As shown in FIG. 8, undulating illumination is observed. More specifically, high illuminations are obtained at points corresponding to the positions of the lens, however, the illumination levels are relatively low in the portions corresponding to zones between two adjacent LEDs. The inventors presumed that the undulating illumination results from the LEDs having directionality in emitting light. Uneven illumination distribution on the document would cause an image sensor to erroneously detect the images on the document.

One solution to solve the above-noted problem would be to increase the number of LEDs to tightly arrange the LEDS. However, this increases the cost of the device. Another solution would be to position the LEDs apart further from the reading position on the document than in the standard positioning. By doing so, it is known that evenly distributed illumination can be obtained. However, the amount of light at the document surface decreases as the distance between the document and the LED array is increased. The decrease in the amount of light also causes reading errors.

Figure 10:
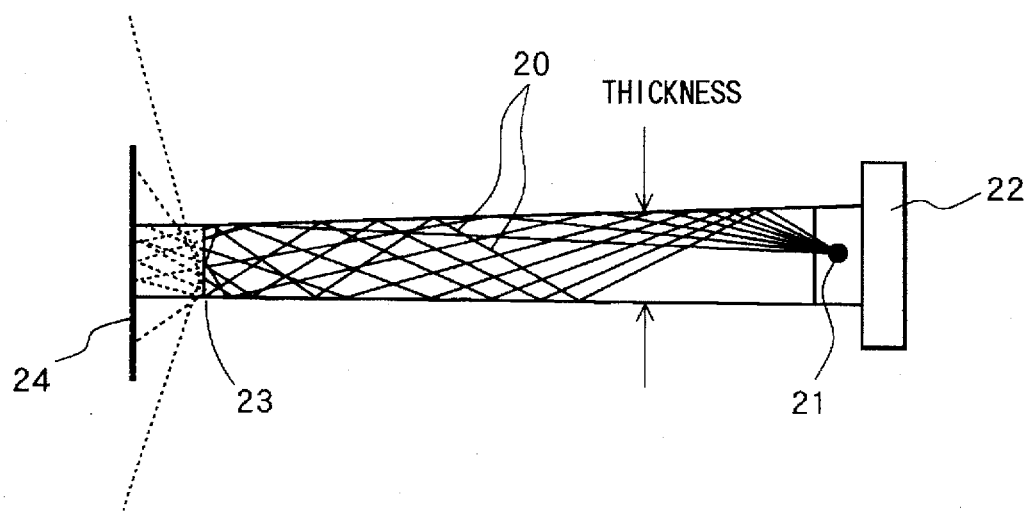
FIG. 10 is an explanatory diagram of the light array shown in FIG. 9 illustrating light paths of light emitted from a light emitting element.

Japanese Laid-Open Utility Model Publication No. Hei-1-77065 discloses using a light guide plate made from a transparent acrylic resin. FIG. 10 is a cross-sectional view showing the light guide plate 20 cut along an optical axis extending from an LED 21 toward a document 24. In the drawing, the direction perpendicular to the sheet of drawing is defined as a widthwise direction of the light guide plate 20. An LED array 21 is mounted on a substrate 22. A light guide plate 20 is disposed so that its one end face covers the LED array 21. The opposite end face of the light guide plate 20 is formed with a lens 23 which extends in the direction parallel to the alignment of the LEDs 21 or the widthwise direction of the light guide plate 20. Side surfaces of the light guide plate 20 are coated with a reflection material for rejecting external light from entering into the light guide plate 20. As shown in FIG. 10, a cross-section of the light guide plate 20 cut along the optical axis is of a tapered shape having a thickness gradually decreasing toward the lens formed end.

Figure 9:
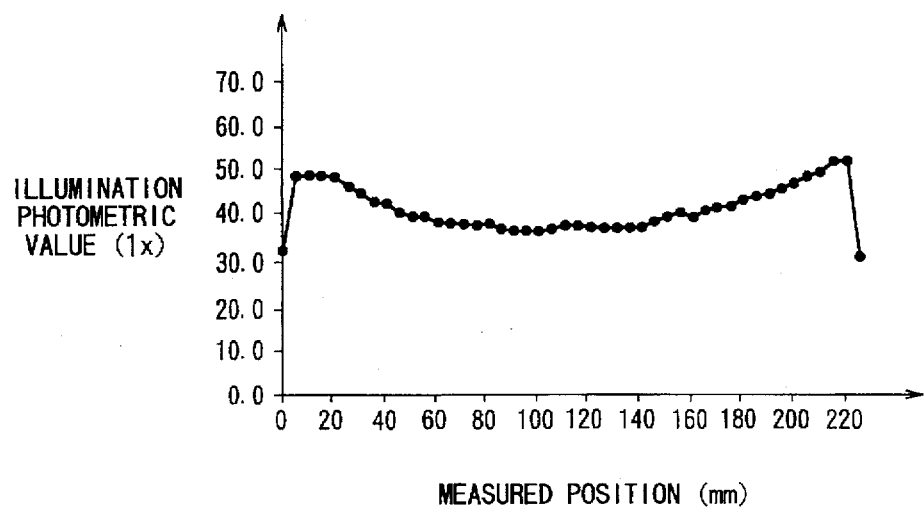
FIG. 9 is a graphical representation showing an illumination distribution of light on a document when a conventional light guide plate is used.

Again, the present inventors conducted experiments with respect to the light guide plate 20 to investigate how the light emitted from the LED array 21 is illuminated on the surface of the document through the light guide plate 20. FIG. 9 shows the experimental results. As is apparent from FIG. 9, a relatively uniform illumination could obtained in the widthwise direction of the light guide plate 20. The illuminations at both ends of the widthwise side of the plate 20 are about 50 to 55 lux and the illumination at the center portion of the widthwise side of the plate 20 is about 40 lux. The illumination of 40 to 50 lux is, however, not sufficient for the image sensor to read the images on the document.

The experimental results in FIG. 9 can be analyzed by referring to the light path inside the light guide plate 20. As shown in FIG. 10, the light passes through the light guide plate 20 while being subjected to total reflections, emerged from the light guide plate 20 out to air, and irradiated onto the document 24. Because the thickness of the light guide plate 20 gradually decreases toward the lens formed side face, the light just emerged from the light guide plate 20 tends to defuse. In view of such an analysis, the present inventors considered that the illumination on the surface of the document could be improved if this light diffusion tendency can be suppressed or corrected.

Figure 11:
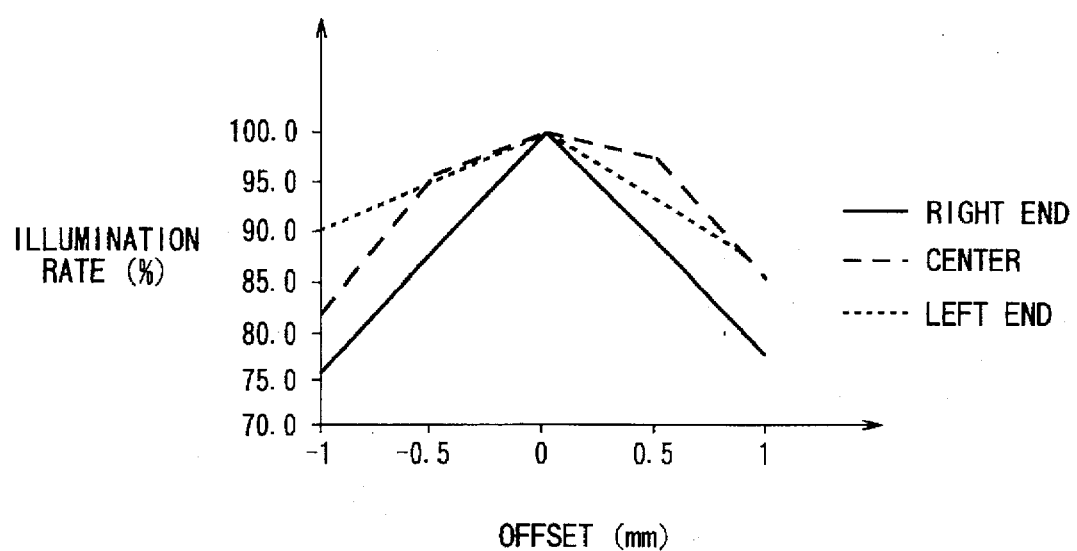
FIG. 11 is a graphical representation showing illumination distributions of light on a transversal cross-section of the conventional light guide plate.

The inventors conducted further experiments to measure the light illuminations at the right, center and left portions in the transversal cross-section of the light guide plate 20 cut along a transversal line that is perpendicular to the optical axis and in parallel with the widthwise direction of the light guide plate 20. FIG. 11 shows the results of the measurements. In FIG. 11, the reference position in each of the right center and left positions in the transversal cross-section is indicated s being zero (0) in offset in the axis of abscissa. The illumination in positions offset from the respective reference positions is represented by percentage with respect to the illumination in the corresponding reference positions. As can be seen in FIG. 11, in the center portion of the transversal cross-section, illumination remains substantially uniform whereas in the right and left portions of the transversal cross-section, illuminations in offset positions lower in proportion to an amount of offset. Based on such data, it can be seen that more evenly distributed illumination could be obtained with increase in light illumination in offset positions.

The present invention has been made based on the above-described observations. Preferred embodiments of the present invention will now be described with reference to the accompanying drawings.

Figure 1:
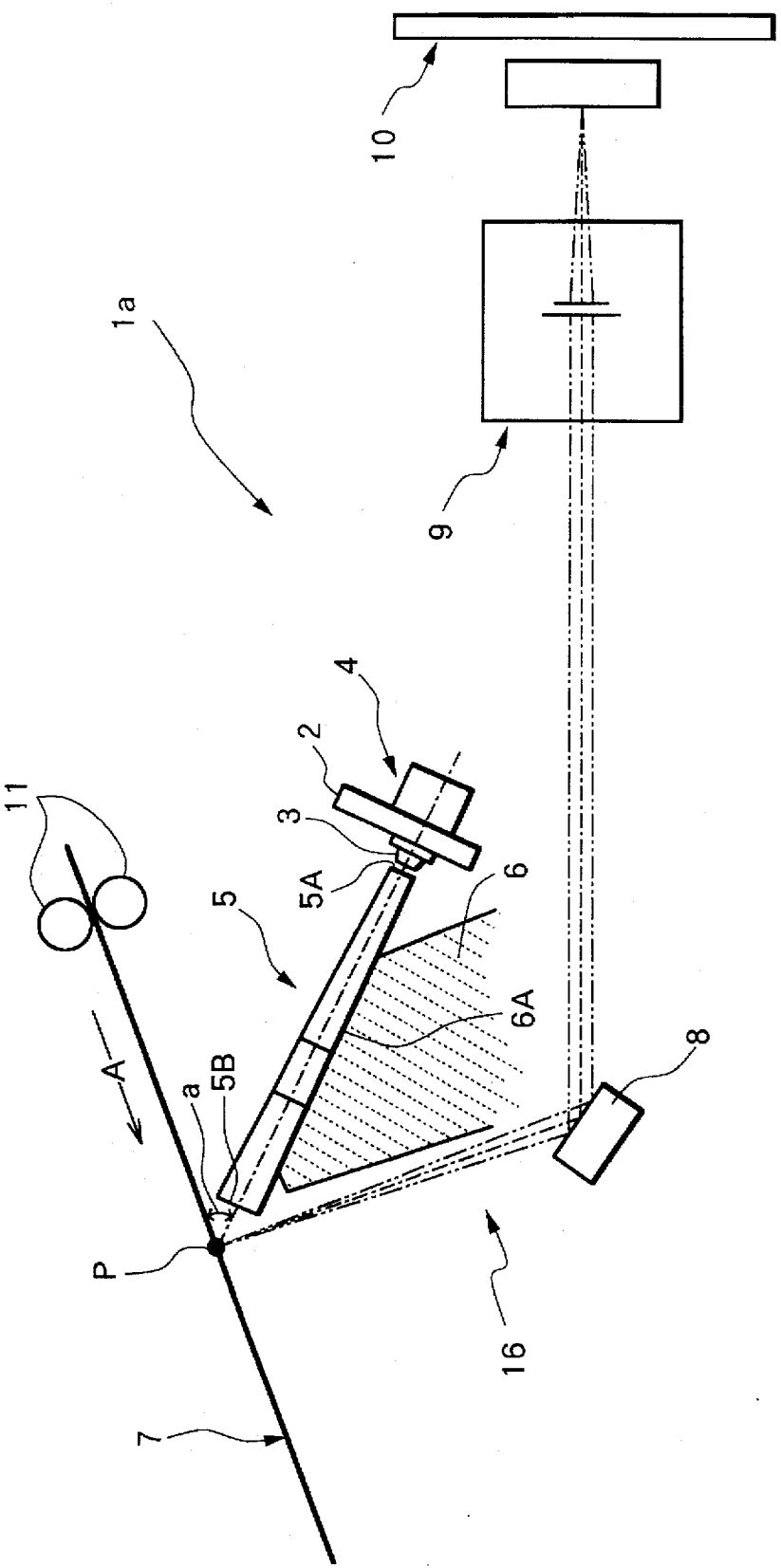
FIG. 1 is an explanatory diagram schematically illustrating an optical reading system according to the present invention.

FIG. 1 shows an optical reading system according to the present invention. The optical reading system includes a first optical guide device 1a, a second optical guide device 1b, and a document feeding mechanism 11. The first optical guide device 1a includes a light source 4 and a light guide plate 5. The light source 4 includes a plurality of LEDs 3 which are mounted on a substrate 2 and aligned in a direction perpendicular to the sheet of drawing at a regular interval. Here, the direction in which the LEDs 3 are aligned will be termed as widthwise direction and the direction perpendicular to the widthwise direction will be termed as longitudinal direction.

A light guide plate 5 is supported on the slanted surface of a support member 6 so that the longitudinal axis of the light guide plate 5 extending in the longitudinal direction and the face of a document 7 form an angle of 45 degrees. The light guide plate 5 is positioned between the LED array 3 and a document 7. The light guide plate 5 has a light incident side face 5A confronting the LED array 3 and a light emerging side face 5B facing the document 7. The light guide plate 5 has a tapered cross-section when cut along the longitudinal axis in an orientation in which the cutting direction and the widthwise direction form a right angle. The thus cut tapered cross-section has a thickness in the direction perpendicular to both the widthwise direction and the longitudinal direction. In the present invention, the light guide plate 5 has such a shape that the thickness of the above-defined tapered cross-section gradually increases toward the light emerging side face 5B. An angle formed between the slanted side of the tapered cross-section and the longitudinal axis is about 3 degrees. Therefore, the thickness of the tapered cross-section in the light incident side face 5A is at minimum and the thickness thereof in the light emerging side face 5B is at the maximum. In a first embodiment of the present invention, the thickness in the light emerging side face 5B is set to about 3 mm. In a second embodiment of the present invention, the thickness in the light incident side face 5A is set to about 3 mm.

The document 7 is transported in the direction indicated by an arrow A by means of the document feeding mechanism 11. The document 7 is continuously transported to pass a reading point P onto which the light emerging from the side face 5B of the light guide plate 5 is illuminated. The light reflected from the document 7 is guided by the second light guide device 1b which includes a mirror 8 and a lens 9. The reflected light enters the lens 9 after being changed its light path by the mirror 8. The light is converged by the lens 9 and is applied onto a CCD unit 10 serving as an image sensor. In this way, reading of image data on the document 7 is performed.

Experiments were conducted to investigate the illumination distribution of the belt-shaped light beam at the reading point P on the document 7. The conditions for the experiments were the same as those performed with respect to the firstly described conventional optical arrangement. Specifically, the LED array 3 including eighteen LEDs and the light guide plate 5 of 225 mm width in the widthwise direction are used. A photo-diode is disposed 3 mm apart from the light emerging side face 5B of the light guide plate 5. An illuminometer is coupled to the photo-diode to measure the illumination distribution of light at the reading point P.

Figure 2:
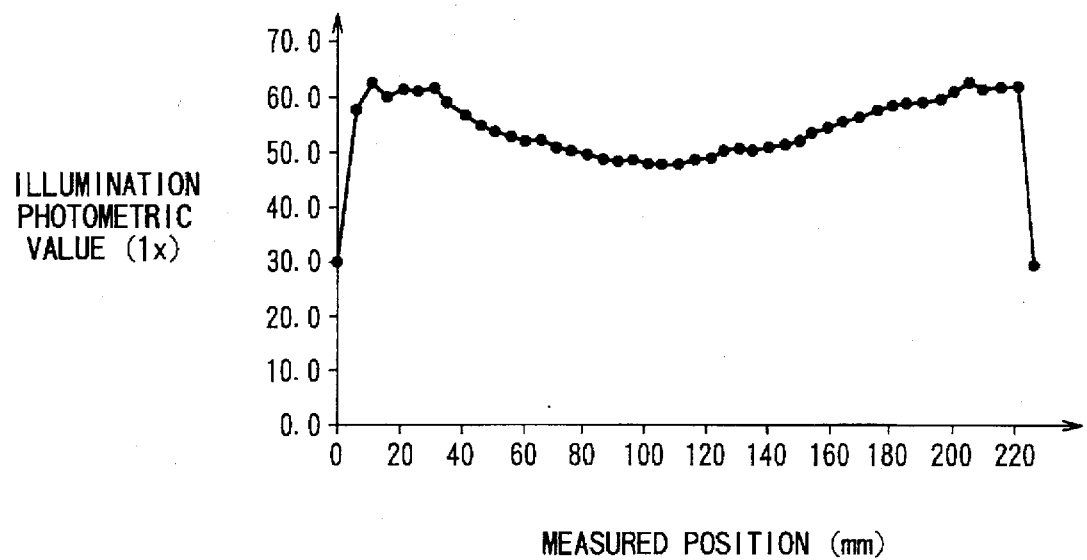
FIG. 2 is a graphical representation showing a light illumination distribution on a light receiving surface of a CCD unit when a light guide device of a first embodiment of the present invention is used.
Figure 5:
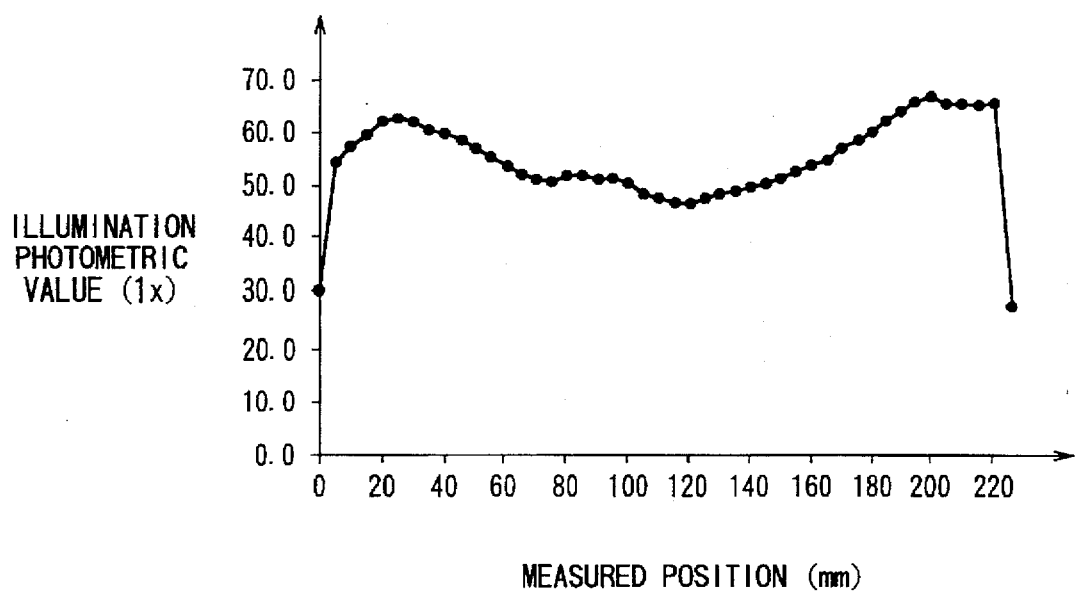
FIG. 5 is a graphical representation showing a light illumination distribution on a light receiving surface of the CCD unit when a light guide device of a second embodiment of the present invention is used.

FIG. 2 shows the experimental results when the light guide plate 5 of the first embodiment is used, and FIG. 5 shows the experimental results when the light guide plate 5 of the second embodiment is used. As is apparent from FIGS. 2 and 5, a relatively uniform illumination could obtained in the widthwise direction of the light guide plate 5 in comparison with the illumination distribution shown in FIG. 8. In both embodiments, the illuminations at both ends of the widthwise side of the plate 5 are about 60 to 65 lux and the illumination at the center portion of the widthwise side of the plate 5 is about 50 lux. With the use of the light guide plate 5 according to the embodiments of the present invention, the illumination in the widthwise direction increases by about 20% in comparison with that attained with the light guide plate 20 shown in FIG. 10.

Figure 3:
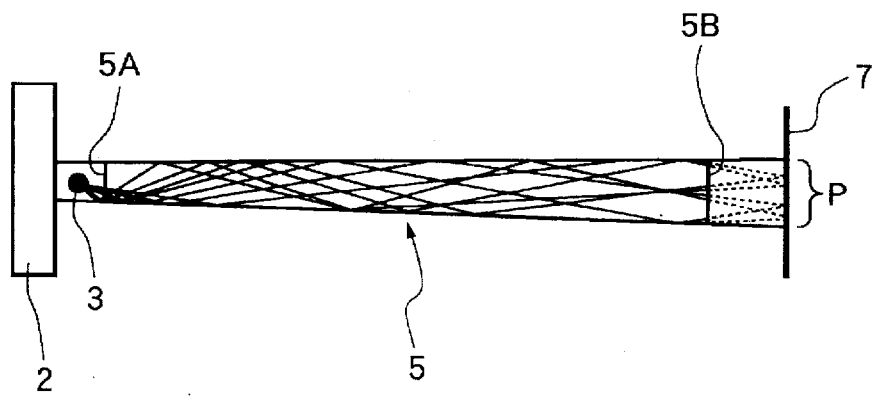
FIG. 3 is an explanatory diagram of the first embodiment illustrating light paths of light emitted from a light emitting element.
Figure 6:
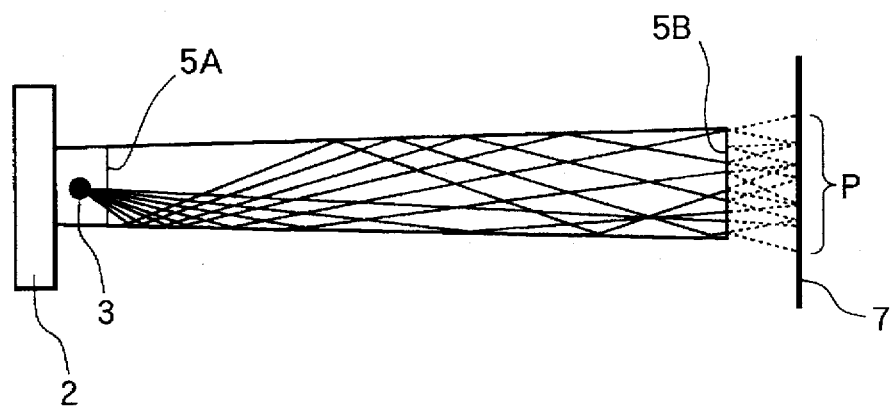
FIG. 6 is an explanatory diagram of the second embodiment illustrating light paths of light emitted from a light emitting element.

The experimental results in FIGS. 2 and 5 can be analyzed by referring to the light path inside the light guide plate 5. As shown in FIGS. 3 and 6, the light passes through the light guide plate 5 while being subjected to total reflections, emerged from the light guide plate 5 out to air, and irradiated onto the document 2. With the light guide plate 5 having the above-defined thickness gradually increasing toward the light emerging side face 5A, the light just emerged from the light guide plate 5 tends to focus. As a result, the illumination on the surface of the document becomes high level and uniform over the entire cross-sectional area of the light beam.

Figure 4:
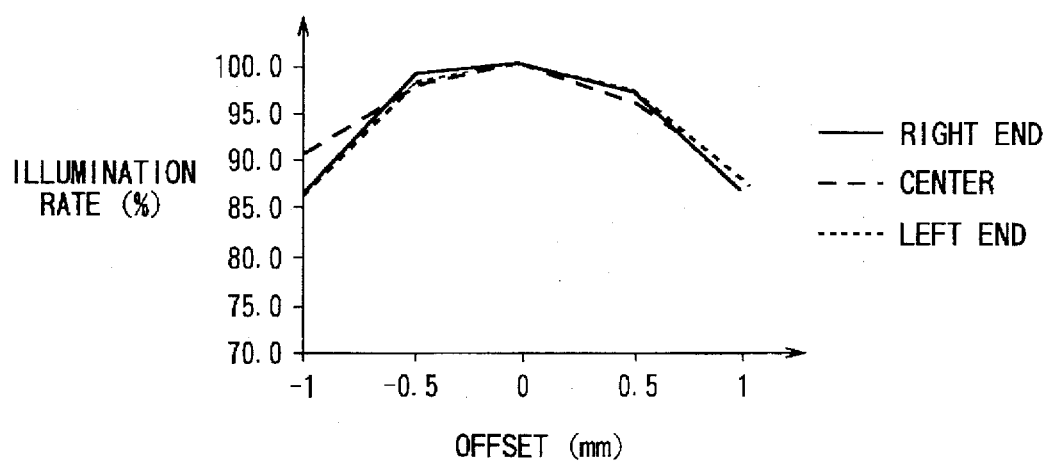
FIG. 4 is a graphical representation showing illumination distributions of light on a transversal cross-section of the light guide plate in the first embodiment.
Figure 7:
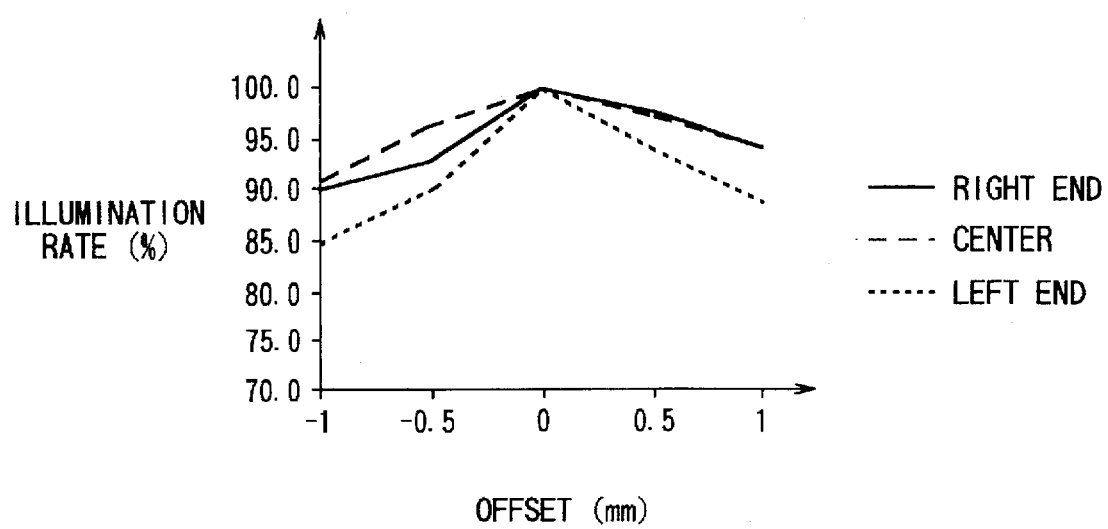
FIG. 7 is a graphical representation showing illumination distributions of light on a transversal cross-section of the light guide plate in the second embodiment.

Further experiments were conducted to measure the light illuminations at the right, center and left portions in the transversal cross-section of the light guide plate 5 cut along a transversal line that is perpendicular to the longitudinal axis and in parallel with the widthwise direction of the light guide plate 5. These experiments are similar to these described with reference to FIG. 11. FIG. 4 shows the results of the measurements when the light guide plate 5 of the first embodiment is used and FIG. 7 shows the results of the measurements when the light guide plate 5 of the second embodiment is used. As can be seen in FIGS. 4 and 7, an extremely small decrease in the illumination is observed in the regions within ±1 mm offset positions. Further, the illumination does not decrease significantly but decreases gradually following a parabolic curve in larger offset positions.

With the use of the light guide plate 5 having a thickness increasing toward the light emerging side face 5B, the light illuminated onto the surface of the document 7 is high in level and uniform in illumination distribution over the entire length of the light. Accordingly, the document reading errors in the CCD unit 10 does not occur in the optical reading system of the present invention.

While exemplary embodiments of this invention has been described in detail, those skilled in the art will recognize that there are many possible modifications and variations which may be made in these exemplary embodiments while yet retaining many of the novel features and advantages of the invention. Accordingly, all such modifications and variations are intended to be included within the scope of the appended claims. For example, in the embodiments, the document is fed by the document feeding mechanism 11, at least one of the document and the first light guide device 1a can he moved relative to each other.

What is claimed is:

1. An optical guide system comprising:

a light source emitting light;

a light guide plate made from a material into which the light emitted from said light source passes, said light guide plate having a top surface and a bottom surface with a thickness of said guide plate being defined as the perpendicular distance between said top and bottom surfaces, a longitudinal axis, a first side face perpendicular to the longitudinal axis, and a second side face opposite to the first side face, wherein said light source is disposed in confrontation with the first side face to allow the light emitted from said light source to incident thereon and a document carrying an image to be optically read is disposed to face the second side face so that the light emerged from the second side face is projected thereonto, and said light guide plate having a cross section taken along the longitudinal axis in the direction of said thickness with a tapered shape having a side slanted with respect to the longitudinal axis, and the thickness of said light guide plate increases toward the second side face.

2. An optical guide device according to claim 1, wherein an angle formed between the side of the tapered shaped and the longitudinal axis is substantially equal to 3 degrees.

3. An optical guide device according to claim 2, wherein said light source comprises a plurality of light emitting elements juxtaposed in a direction perpendicular to the longitudinal axis.

4. An optical guide device according to claim 3, wherein the thickness of said light guide plate at the second side face is substantially equal to 3 mm.

5. An optical guide device according to claim 3, wherein the thickness of said light guide plate at the first side face is substantially equal to 3 mm.

6. An optical reading system comprising:
a first optical guide device including a light source emitting light; and a light guide plate made from a material into which the light emitted from said light source passes, said light guide plate having a top surface and a bottom surface with a thickness of said guide plate being defined as the perpendicular distance between said top and bottom surfaces, a longitudinal axis, a first side face perpendicular to the longitudinal axis, and a second side face opposite to the first side face, wherein said light source is disposed in confrontation with the first side face to allow the light emitted from said light source to incident thereon and a document carrying an image to be optically read is disposed to face the second side face so that the light emerged from the second side face is projected thereonto, and said light guide plate having a cross-section taken along the longitudinal axis in the direction of said thickness with a tapered shape having a side slanted with respect to the longitudinal axis, and the thickness of said light guide plate increases toward the second side face;

a moving mechanism for moving at least one of said first optical guide device and the document relative to each other;

a second optical guide device receiving the light reflected from the document and guiding the light along a predetermined path; and an image sensor receiving the light guided by said second optical guide device.

7. An optical reading system according to claim 6, wherein an angle formed between the side of the tapered shape and the longitudinal axis is substantially equal to 3 degrees.

8. An optical reading system according to claim 7, wherein said light source comprises a plurality of light emitting elements juxtaposed in a direction perpendicular to the longitudinal axis.

9. An optical reading system according to claim 8, wherein the thickness of said light guide plate at the second side face is substantially equal to 3 mm.

10. An optical reading system according to claim 8, wherein the thickness of said light guide plate at the first side face is substantially equal to 3 mm.

11. An optical reading system according to claim 6, wherein said first optical guide device is fixedly mounted and said moving mechanism moves the document relative to said first optical guide device.

12. An optical reading system according to claim 6, wherein said image sensor comprises a plurality of charge-coupled devices.

* * * * *